United States Patent
Nair et al.

(10) Patent No.: US 10,365,115 B2
(45) Date of Patent: Jul. 30, 2019

(54) METHOD AND APPARATUS FOR PROVIDING AN ALTERNATIVE ROUTE BASED ON TRAFFIC LIGHT STATUS

(71) Applicant: Nokia Technologies Oy, Espoo (FI)

(72) Inventors: Prasanth Nair, Naperville, IL (US); Reshmi Nair, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 291 days.

(21) Appl. No.: 14/846,311

(22) Filed: Sep. 4, 2015

(65) Prior Publication Data
US 2017/0069208 A1    Mar. 9, 2017

(51) Int. Cl.
G08G 1/0968    (2006.01)
G08G 1/01      (2006.01)
G01C 21/34     (2006.01)
G01C 21/36     (2006.01)

(52) U.S. Cl.
CPC ..... *G01C 21/3415* (2013.01); *G01C 21/3492* (2013.01); *G01C 21/3602* (2013.01); *G08G 1/012* (2013.01); *G08G 1/0112* (2013.01); *G08G 1/0116* (2013.01); *G08G 1/0133* (2013.01);
(Continued)

(58) Field of Classification Search
None
See application file for complete search history.

(56) References Cited

U.S. PATENT DOCUMENTS

| 8,972,145 | B2 | 3/2015 | Mahler et al. |
| 2006/0009188 | A1* | 1/2006 | Kubota ............ G08G 1/096725 455/344 |

(Continued)

FOREIGN PATENT DOCUMENTS

| EP | 1968030 B1 | 10/2012 |
| JP | 2008305299 A | 12/2008 |
| WO | 2006060075 A1 | 6/2006 |

OTHER PUBLICATIONS

Koukoumidis et al., "SignalGuru: Leveraging Mobile Phones for Collaborative Traffic Signal Schedule Advisory", 9th International Conference on Mobile Systems, Applications, and Services, Jun. 28-Jul. 1, 2011, 15 Pages.

(Continued)

*Primary Examiner* — Hussein Elchanti
*Assistant Examiner* — Paul A Castro
(74) *Attorney, Agent, or Firm* — Ditthavong & Steiner, P.C.

(57) ABSTRACT

An approach is provided for determining an alternative route based on status information of a traffic signal and/or attributes associated with a road segment. The approach involves determining status information for the at least one traffic signal based, at least in part, on a determination that at least one vehicle is within at least one distance threshold. The approach also involves causing, at least in part, a calculation of at least one alternative route based, at least in part, on the status information for the at least one traffic signal, one or more attributes associated with at least one road segment, or a combination thereof. The approach further involves causing, at least in part, a comparison of estimated time of arrival by the use of the at least one alternative route, at least one original route, or a combination thereof to determine at least one recommended route.

18 Claims, 14 Drawing Sheets

(52) U.S. Cl.
CPC ..... *G08G 1/0145* (2013.01); *G08G 1/096811* (2013.01); *G08G 1/096844* (2013.01)

(56) References Cited

U.S. PATENT DOCUMENTS

| | | | | |
|---|---|---|---|---|
| 2014/0277986 | A1* | 9/2014 | Mahler | G06F 7/00 701/93 |
| 2015/0226565 | A1* | 8/2015 | Beaurepaire | G01C 21/34 701/533 |
| 2015/0262480 | A1* | 9/2015 | Fowe | G01C 21/3492 701/117 |

OTHER PUBLICATIONS

Apple et al., "Green Driver: AI in a Microcosm", Proceedings of the Twenty-Fifth AAAI Conference on Artificial Intelligence, Aug. 7-11, 2011, pp. 1311-1316.

Stolfi et al., "Red Swarm: Smart Mobility in Cities with EAs", GECCO 2013—Proceedings of the 2013 Genetic and Evolutionary Computation Conference, Jul. 6-10, 2013, 8 Pages.

Imagine With Orange, "Smart Traffic Light system—Saving fuel and energy", Web Page, Mar. 31, 2015, retrieved on Sep. 22, 2015 from http://imagine.orange.com/en/smart-city/idea/show/876, 12 Pages.

\* cited by examiner

METHOD AND APPARATUS FOR PROVIDING AN ALTERNATIVE ROUTE BASED ON TRAFFIC LIGHT STATUS

BACKGROUND

Conventional navigation devices display multiple routes from the current position of at least one vehicle towards at least one destination. These multiple routes may include intersections where traffic signals are positioned, however, the status of the traffic lights are not incorporated while updating the routes. As a result, service providers and device manufacturers (e.g., wireless, cellular, etc.) are continually challenged to deliver value and convenience to consumers by, for example, providing a service that optimizes travel time for users by calculating faster alternative routes by capturing the status of changing traffic lights while the vehicle is approaching a traffic signal.

SOME EXAMPLE EMBODIMENTS

Therefore, there is a need for an approach for determining an alternative route based on status information of a traffic signal and/or attributes associated with a road segment.

According to one embodiment, a method comprises determining status information for the at least one traffic signal based, at least in part, on a determination that at least one vehicle is within at least one distance threshold. The method also comprises causing, at least in part, a calculation of at least one alternative route based, at least in part, on the status information for the at least one traffic signal, one or more attributes associated with at least one road segment, or a combination thereof. The method further comprises causing, at least in part, a comparison of estimated time of arrival by the use of the at least one alternative route, at least one original route, or a combination thereof to determine at least one recommended route.

According to another embodiment, an apparatus comprises at least one processor, and at least one memory including computer program code for one or more computer programs, the at least one memory and the computer program code configured to, with the at least one processor, cause, at least in part, the apparatus to determine status information for the at least one traffic signal based, at least in part, on a determination that at least one vehicle is within at least one distance threshold. The apparatus is also caused to cause, at least in part, a calculation of at least one alternative route based, at least in part, on the status information for the at least one traffic signal, one or more attributes associated with at least one road segment, or a combination thereof. The apparatus is further caused to cause, at least in part, a comparison of estimated time of arrival by the use of the at least one alternative route, at least one original route, or a combination thereof to determine at least one recommended route.

According to another embodiment, a computer-readable storage medium carries one or more sequences of one or more instructions which, when executed by one or more processors, cause, at least in part, an apparatus to determine status information for the at least one traffic signal based, at least in part, on a determination that at least one vehicle is within at least one distance threshold. The apparatus is also caused to cause, at least in part, a calculation of at least one alternative route based, at least in part, on the status information for the at least one traffic signal, one or more attributes associated with at least one road segment, or a combination thereof. The apparatus is further caused to cause, at least in part, a comparison of estimated time of arrival by the use of the at least one alternative route, at least one original route, or a combination thereof to determine at least one recommended route.

According to another embodiment, an apparatus comprises means for determining status information for the at least one traffic signal based, at least in part, on a determination that at least one vehicle is within at least one distance threshold. The apparatus also comprises means for causing, at least in part, a calculation of at least one alternative route based, at least in part, on the status information for the at least one traffic signal, one or more attributes associated with at least one road segment, or a combination thereof. The apparatus further comprises means for causing, at least in part, a comparison of estimated time of arrival by the use of the at least one alternative route, at least one original route, or a combination thereof to determine at least one recommended route.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining an alternative route based on status information of a traffic signal and/or attributes associated with a road segment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Presently, a navigation device calculates different routes for one or more users to select, but there is no known method of optimizing travel time by detecting changes in traffic light status to update the routes. In one scenario, the navigation device does not update routes based on changing traffic light status. Even though alternate routes are calculated and presented to a user for navigation, once the user chooses a particular route, the user is directed using that route unless the user deters in between. The route never changes based on traffic light status changes. As a result, there is a need for a method that optimizes travel time on the fly by detecting the status changes of traffic signals.

Figure 1A:
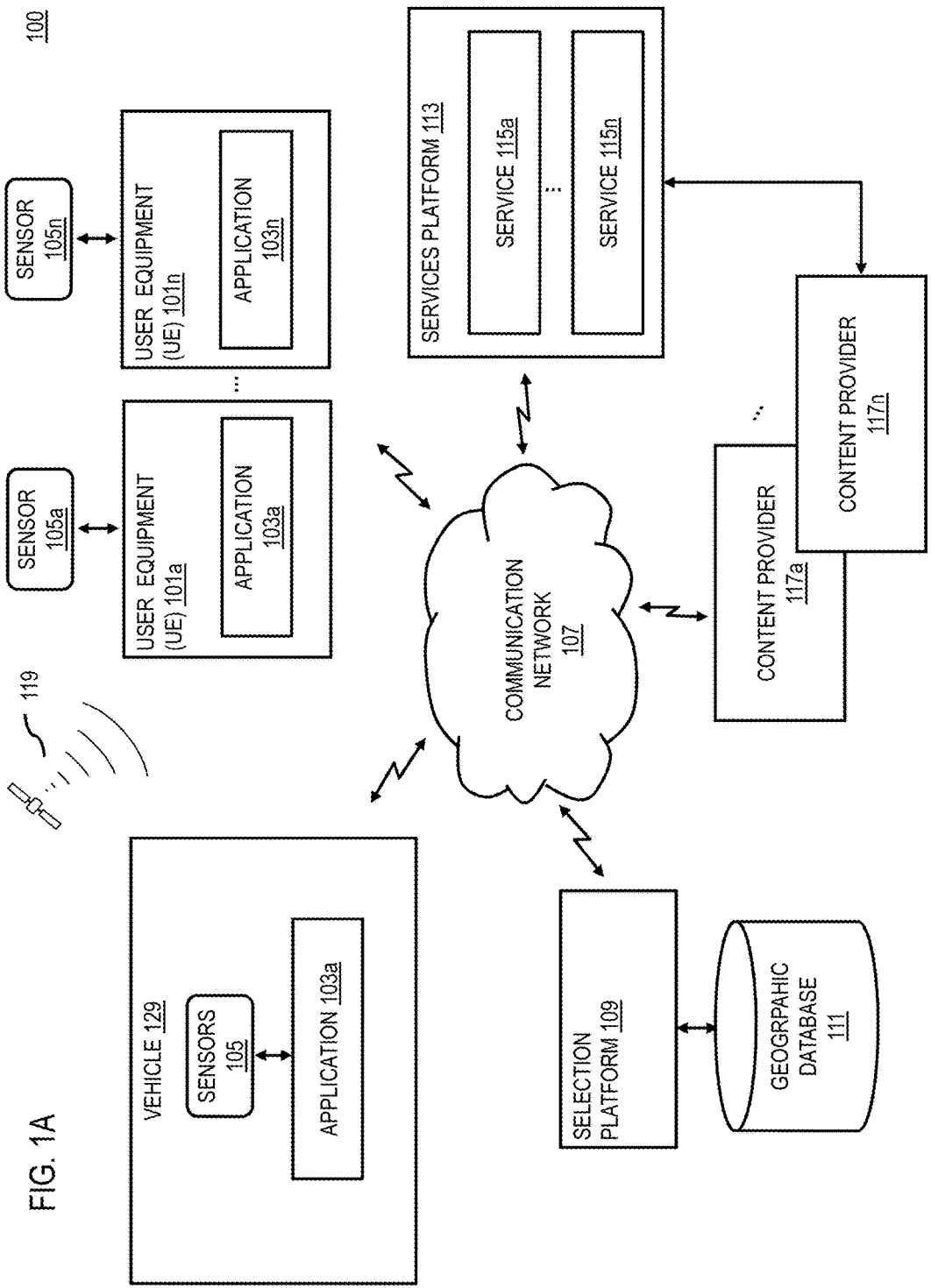
FIG. 1A is a diagram of a system capable of determining an alternative route based on status information of a traffic signal and/or attributes associated with a road segment, according to one embodiment.

To address this problem, FIG. 1A is a diagram of a system capable of optimizing travel time for at least one vehicle by detecting status changes of traffic signals. In one scenario, mobile phone cameras and/or on-dash cameras may capture status changes of traffic signals. Then, this information is utilized by system 100 for recalculating a new route with shorter travel time. The system 100 provides for dynamic re-calculation of route steps based on traffic light changes, and reduces driving time which in turn optimizes arrival time. This method promotes less idling of engines at traffic signals thereby saving fuel and engine life.

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a selection platform 109 via the communication network 107. In one embodiment, the selection platform 109 performs one or more functions associated with determining an alternative route based on status information of a traffic signal and/or attributes associated with a road segment.

As shown in FIG. 1A, the system 100 comprises of UE 101. In one embodiment, the UE 101 may include, but is not restricted to, any type of a mobile terminal, fixed terminal, or portable terminal. Examples of the UE 101, may include, but are not restricted to, a mobile handset, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), or any combination thereof, including the accessories and peripherals of these devices, or any combination thereof. In one embodiment, the UE 101 may support any type of interface for supporting the presentment of one or more recommended routes towards at least one destination. In addition, the UE 101 may facilitate various input means for receiving and generating information, including, but not restricted to, a touch screen capability, a keyboard and keypad data entry, a voice-based input mechanism, and the like. Any known and future implementations of the UE 101 may also be applicable. In one embodiment, the UE 101 may be included within the one or more vehicles.

The UE 101 may further include applications 103. Further, the applications 103 may include various applications such as, but not restricted to, location-based service application, navigation application, content provisioning application, camera/imaging application, media player application, social networking application, calendar applications, and the like. In one embodiment, the applications 103 are installed within the UE 101. In one example embodiment, a location-based service application installed in the UE 101 enables the selection platform 109 to determine position and speed for one or more vehicles. In another embodiment, the camera/imaging application installed in the UE 101 enables the selection platform 109 to determine the status for one or more traffic signals. In one embodiment, one of the applications 103 at the UE 101 may act as a client for the selection platform 109 and perform one or more functions associated with the functions of the selection platform 109 by interacting with the selection platform 109 over the communication network 107.

The system 100 also includes sensors 105. The sensors 105 may be any type of sensor. In certain embodiments, the sensors 105 may include, for example, but not restricted to, a global positioning sensor for gathering location data, Light Detection And Ranging (LIDAR) for gathering distance data, a network detection sensor for detecting wireless signals or receivers for different short-range communications (e.g., Bluetooth, Wi-Fi, Li-Fi, Near Field Communication (NFC) etc.), temporal information sensors, a camera/imaging sensor for gathering image data (e.g., the camera sensors may automatically capture traffic lights for analysis purpose), and the like. In another embodiment, the sensors 105 may include light sensors, oriental sensors augmented with height sensor and acceleration sensor (e.g., an accelerometer can measure acceleration and can be used to determine orientation of the UE 101), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors 105 may detect weather data, traffic information, or a combination thereof. In one example embodiment, the UE 101 may include GPS receivers to obtain geographic coordinates from satellites 119 for determining current location and time associated with the UE 101. Further, the location can be determined by a triangulation system such as A-GPS, Cell of Origin, or other location extrapolation technologies. In another example embodiment, the one or more sensors may provide in-vehicle navigation services, wherein one or more location based services may be provided to the at least one UE 101 associated with the at least one user of the vehicle and/or at least one other UE 101 associated with the at least one vehicle.

Further, various elements of the system 100 may communicate with each other through a communication network 107. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the selection platform 109 may be a platform with multiple interconnected components. The selection platform 109 may include multiple servers, intelligent networking devices, computing devices, components and corresponding software for determining an alternative route based on status information of a traffic signal and/or attributes associated with a road segment. In addition, it is noted that the selection platform 109 may be a separate entity of the system 100, a part of the one or more services 115a-115n (collectively referred to as services 115) of the services platform 113, or included within the UE 101 (e.g., as part of the applications 103).

In one embodiment, the selection platform 109 may determine status information for the at least one traffic signal based, at least in part, on a determination that at least one vehicle is within at least one distance threshold. In one scenario, the selection platform 109 may determine that at least one vehicle is within at least one distance threshold from at least one traffic signal via sensors 105. Then, the selection platform 109 may optimize arrival time of the vehicle by determining alternative routing information based, at least in part, on current color of the signal, the vehicle speed, or a combination thereof. In one example embodiment, the selection platform 109 may determine the traffic light to be yellow. Then, the selection platform 109 may determine that the at least one vehicle is approaching the traffic signal at a reasonable speed. Subsequently, the selection platform 109 may recommend an alternative route wherein the vehicle may be recommended to stop at the red light and then make a left turn when the left turn only signal is displayed.

In one embodiment, the selection platform 109 may cause, at least in part, a calculation of at least one alternative route based, at least in part, on the status information for the at least one traffic signal, one or more attributes associated with at least one road segment, or a combination thereof. In one scenario, the selection platform 109 may detect status changes of traffic signals through mobile phone camera or on-dash camera, and may recalculate a new route with shorter travel time based, at least in part, on the detected status changes. In one scenario, the selection platform 109 may detect changes in signal light for the at least one traffic signal via sensors 105. In another scenario, the selection platform 109 may obtain data pertaining to schedules for signal light for the at least one traffic signal from various databases. In a further scenario, the selection platform 109 may determine attributes for road segments, such as, traffic volume attributes, number of lanes, signage information, or a combination thereof associated with at least one road segment via sensors 105.

In one embodiment, the selection platform 109 may cause, at least in part, a comparison of estimated time of arrival by the use of the at least one alternative route, at least one original route, or a combination thereof to determine at least one recommended route. In one scenario, the selection platform 109 may select a route with the fasted estimated time of arrival towards at least one destination by comparing the newly determined route to the prearranged route.

In one embodiment, the geographic database 111 may store attributes for one or more road segments (i.e., traffic signal information, traffic volume information, speed information, etc.). The information may be any multiple types of information that can provide means for aiding in the content provisioning and sharing process.

The services platform 113 may include any type of service. By way of example, the services platform 113 may include mapping services, navigation services, travel planning services, notification services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the selection platform 109 and the content provider 117 to supplement or aid in the processing of the content information.

By way of example, the services 115 may be an online service that reflects interests and/or activities of users. The services 115 allow users to share location information, activities information, contextual information, historical user information and interests within their individual networks, and provides for data portability. The services 115 may additionally assist in providing the selection platform 109 with information on travel plans of at least one user, activity information of at least one user, speed information for at least one user, user profile information, and a variety of additional information.

The content providers 117a-117n (collectively referred to as content provider 117) may provide content to the UE 101, the selection platform 109, and the services 115 of the services platform 113. The content provided may be any type of content, such as, image content (e.g., traffic lights), textual content (e.g., speed information), audio content (e.g., audio notification), video content (e.g., visual notification), etc. In one embodiment, the content provider 117 may provide content that may supplement content of the applications 103, the sensors 105, or a combination thereof. By way of example, the content provider 117 may provide content that may aid in presenting comprehensible representation of traffic signal information. In one embodiment, the content provider 117 may also store content associated with the UE 101, the selection platform 109, and the services 115 of the services platform 113. In another embodiment, the content provider 117 may manage access to a central repository of data, and offer a consistent, standard interface to data, such as, a repository of attributes for one or more road segments, traffic signal information, speed limit information in at least one road segment, or a combination thereof. Any known or still developing methods, techniques or processes for presenting comprehensible representation of traffic flow information may be employed by the selection platform 109.

By way of example, the UE 101, the selection platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
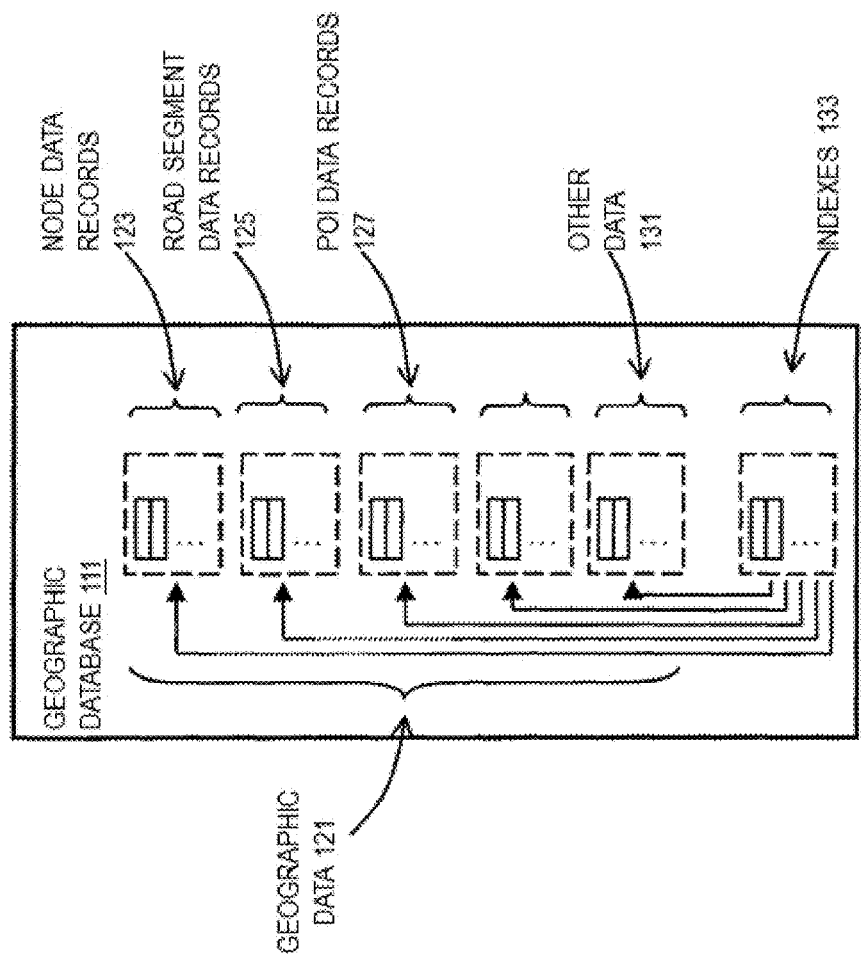
FIG. 1B is a diagram of the geographic database 111 of system 100, according to exemplary embodiments.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, and other data records 131, for example. More, fewer or different data records can be provided. In one embodiment, the other data records 131 include cartographic ("carto") data records, routing data, traffic signal data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, traffic lights, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., schedules for traffic light signals). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions, for example mixed mode traffic map display for travelling in a route with minimal possibility of obstructions (e.g., no red traffic lights, no traffic jams, etc.).

Figure 2:
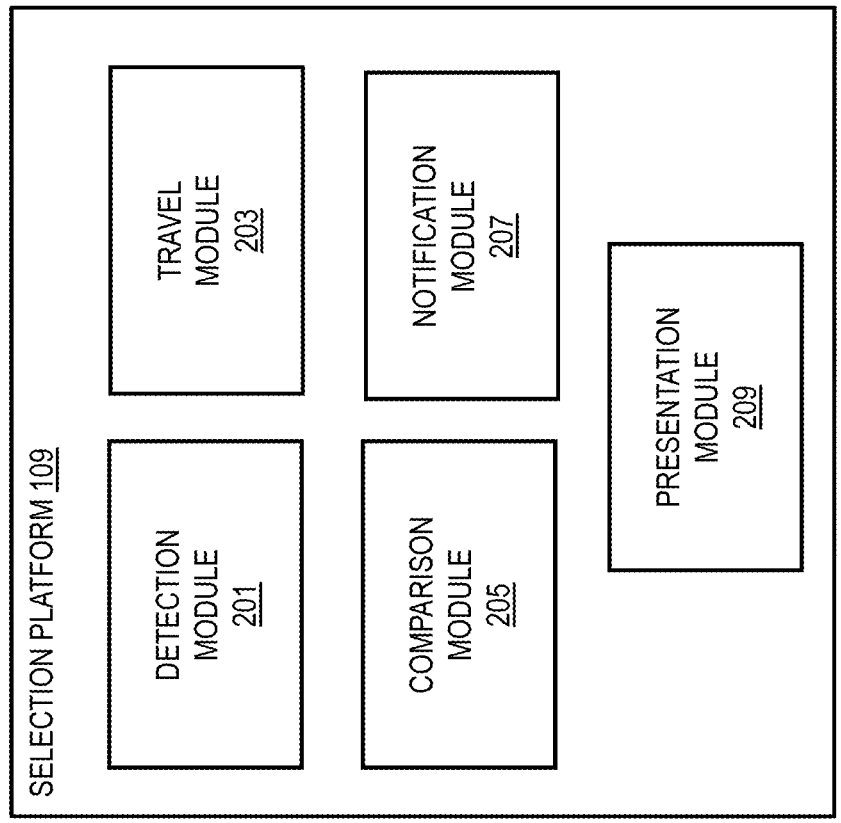
FIG. 2 is a diagram of the components of the selection platform 109, according to one embodiment.

FIG. 2 is a diagram of the components of the selection platform 109, according to one embodiment. By way of example, the selection platform 109 includes one or more components for determining an alternative route based on status information of a traffic signal and/or attributes associated with a road segment. It is contemplated that the functions of these components may be combined in one or more components or performed by other components of equivalent functionality. In one embodiment, the selection platform 109 includes a detection module 201, a travel module 203, a comparison module 205, a notification module 207, and a presentation module 209.

In one embodiment, the detection module 201 includes sensors 105 for determining distance threshold between at least one vehicle and at least one traffic signal. In another embodiment, the detection module 201 includes sensors 105 for detecting a change in signal light for at least one traffic signal. In a further embodiment, the detection module 201 includes sensors 105 for determining acceleration information for at least one vehicle, relative distance between at least one vehicle and one or more neighboring vehicles, or a combination thereof. In one scenario, the detection module 201 may be integrated with one or more advanced detection methods that employ sensors, such as motion sensors, location sensors, lasers, radar, sonar, infrared and other like techniques, to maximize the system's assessment of the contextual environment.

In one embodiment, the travel module 203 may determine road segment parameters. These road segment parameters may include road distance threshold, travel time threshold, a safe speed threshold, a combination thereof and other like parameters. In another embodiment, the travel module 203 may calculate travel information using a variety of means in order to optimize the travel time, efficiency, and/or safety. In one scenario, the mapping data are pre-programmed into the navigational system of the vehicle 129. The travel module 203 may calculate travel characteristics by integrating multiple sources including mapping data, crowd source data, data from networks or databases, weather reports, and real-time information from vehicles. This integrated data may be implemented by the travel module 203 to update the pre-programmed mapping data.

In one embodiment, the comparison module 205 may evaluate other modules using algorithms, and process formats to calculate relevant information and determine discrepancies and errors for one or more road segments. In another embodiment, the comparison module 205 may recommend at least one fastest route by comparing estimated time of arrival between at least one alternative route and at least one original route.

In one embodiment, the notification module 207 may cause a notification of at least one recommended route, at least one time saved by using the recommended route, or a combination thereof. In another embodiment, the notification module 207 may correlate the presentation of notifications in at least one device associated with at least one vehicle, at least one device associated with at least one user, or a combination thereof. In one scenario, the notification may be based, at least in part, on acceleration information. These notifications may be further adapted with user preferences and tolerances, which, in part, provide a personalized modification of the notification system.

In one embodiment, the presentation module 209 obtains a set of summary statistics from the other modules. Then, the presentation module 209 continues with generating a presentation of at least one notification for one or more recommended routes towards at least one destination. In one scenario, numerous inputs may be applicable including network data, sensor inputs, personal preferences, real-time data and other like inputs. In one example embodiment, the presentation module 209 may cause a presentation wherein at least one recommended route may be highlighted. The presentation may also incorporate temporal information (e.g., estimated time of arrival), traffic density information (e.g., number of vehicles nearby), etc.

The above presented modules and components of the selection platform 109 can be implemented in hardware, firmware, software, or a combination thereof. Though depicted as a separate entity in FIG. 1, it is contemplated that the selection platform 109 may be implemented for direct operation by respective UE 101. As such, the selection platform 109 may generate direct signal inputs by way of the operating system of the UE 101 for interacting with the applications 103. In another embodiment, one or more of the modules 201-209 may be implemented for operation by respective UEs, as the selection platform 109, or combination thereof. Still further, the selection platform 109 may be integrated for direct operation with the services 115, such as in the form of a widget or applet, in accordance with an information and/or subscriber sharing arrangement. The various executions presented herein contemplate any and all arrangements and models.

Figure 3:
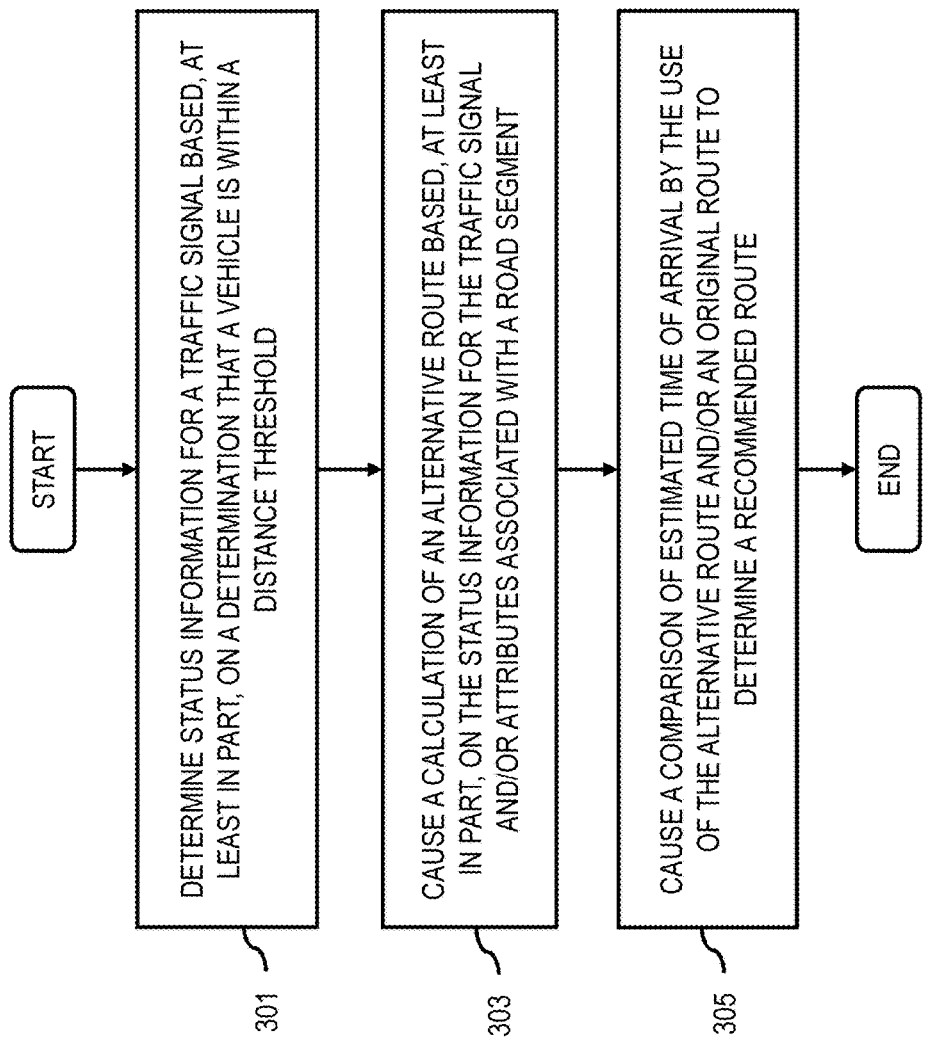
FIG. 3 is a flowchart of a process for determining at least one faster alternative route based, at least in part, on status of traffic lights and/or road attributes, according to one embodiment.
Figure 11:
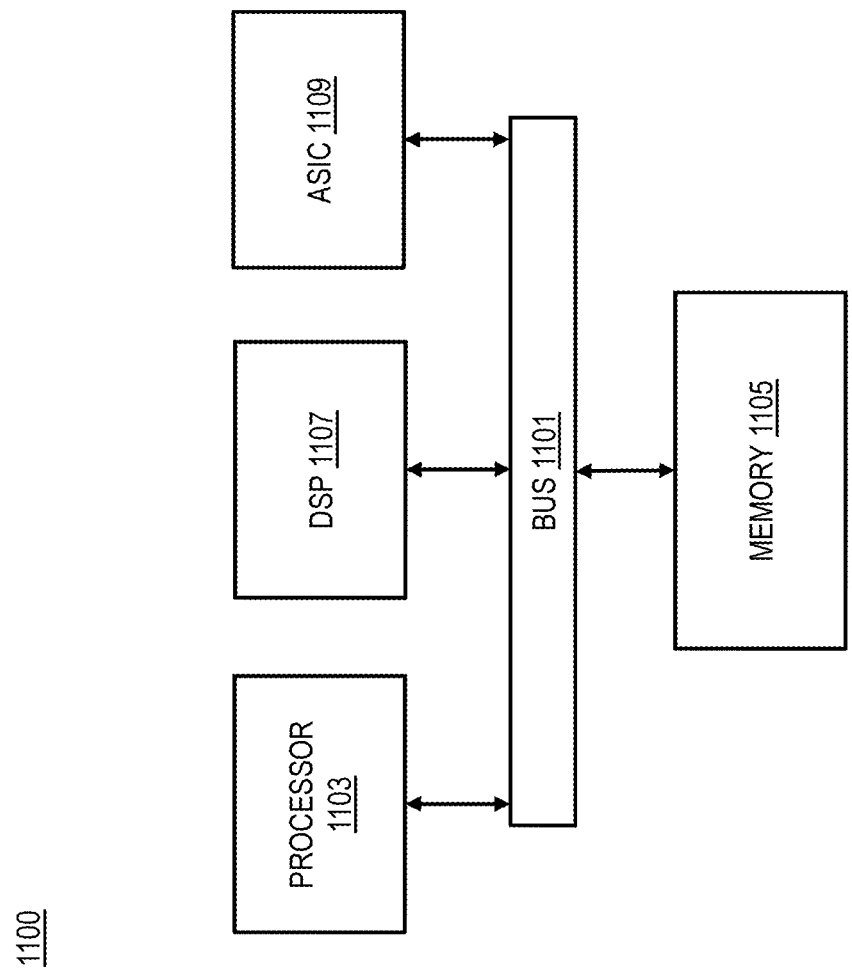
FIG. 11 is a diagram of a chip set that can be used to implement an embodiment of the invention.

FIG. 3 is a flowchart of a process for determining at least one faster alternative route based, at least in part, on status of traffic lights and/or road attributes, according to one embodiment. In one embodiment, the selection platform 109 performs the process 300 and is implemented in, for instance, a chip set including a processor and a memory as shown in FIG. 11.

In step 301, the selection platform 109 may determine status information for the at least one traffic signal based, at least in part, on a determination that at least one vehicle is within at least one distance threshold. In one embodiment, the status information includes change in signal light for the at least one traffic signal. In another embodiment, the status information for the at least one traffic signal is determined based, at least in part, on one or more imaging sensors, at least one traffic signal database, or a combination thereof. In a further embodiment, the at least one vehicle includes at least one autonomous vehicle, at least one highly-assisted driving vehicle, or a combination thereof. In one example embodiment, there may be a predetermined distance threshold between at least one vehicle and at least one traffic signal. For example, the distance threshold at at least one road segment between vehicle "A" and traffic signal "B" may be 200 meters. The selection platform 109 may determine that vehicle "A" is within the distance threshold of 200 meters from the traffic signal "B" via sensors 105. Then, the selection platform may determine the status information for the traffic signal "B".

In step 303, the selection platform 109 may cause, at least in part, a calculation of at least one alternative route based, at least in part, on the status information for the at least one traffic signal, one or more attributes associated with at least one road segment, or a combination thereof. In one embodiment, the one or more attributes associated with the at least one road segment includes a traffic volume attribute, road attributes, or a combination thereof; and wherein the road attributes includes number of lanes in the at least one road segment, signage information, or a combination thereof. In one scenario, the selection platform 109 may take into consideration the speed limits, the traffic density information in the neighboring lanes, etc. while calculating an alternative faster route. In another scenario, the selection platform 109 may take into consideration signage information while determining an alternative faster route, for example, the selection platform 109 may recommend a user to turn right at the traffic signal because the road sign says 'no left turn'. In one scenario, a user may save more time if his/her destination is on the right side. This is because when the traffic light is 'red', a user can still make a right turn if found safe. Also, the 'right turn arrow' is displayed (if there is one) immediately after the traffic light turns 'red'. The user is saving time by waiting for a lesser time at the traffic lights because normally 'right turn arrow' comes on before the green light.

In step 305, the selection platform 109 may cause, at least in part, a comparison of estimated time of arrival by the use of the at least one alternative route, at least one original route, or a combination thereof to determine at least one recommended route. In one scenario, at least one original route may be the prearranged route in at least one navigation device. In one embodiment, the at least one recommended route is a route with a fastest estimated time of arrival at at least one destination.

Figure 4:
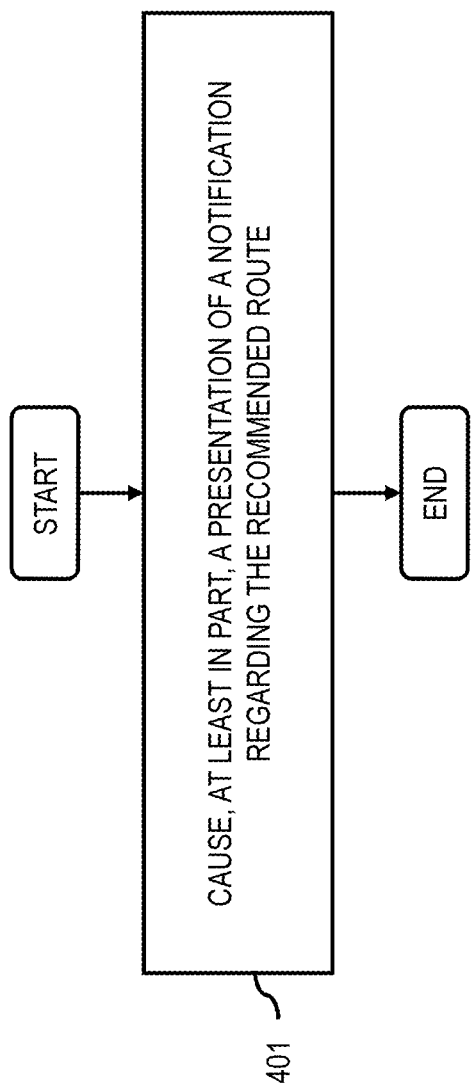
FIG. 4 is a flowchart of a process for causing a presentation of at least one recommended route, according to one embodiment.

FIG. 4 is a flowchart of a process for causing a presentation of at least one recommended route, according to one embodiment. In one embodiment, the selection platform 109 performs the process 400 and is implemented in, for instance, a chip set including a processor and a memory as shown in FIG. 11.

In step 401, the selection platform 109 may cause, at least in part, a presentation of at least one notification regarding the at least one recommended route. In one embodiment, the at least one notification includes, at least in part, information regarding time saved by using the at least one recommended route. In one scenario, the selection platform 109 may cause a presentation of at least one recommended route in at least one UE 101. The presentation may be visual and/or aural. In another scenario, the presentation may include information on the time a user can save by taking the alternative route, the traffic density information in the alternative route, the traffic signal information for the alternative route, or a combination thereof.

Figure 5:
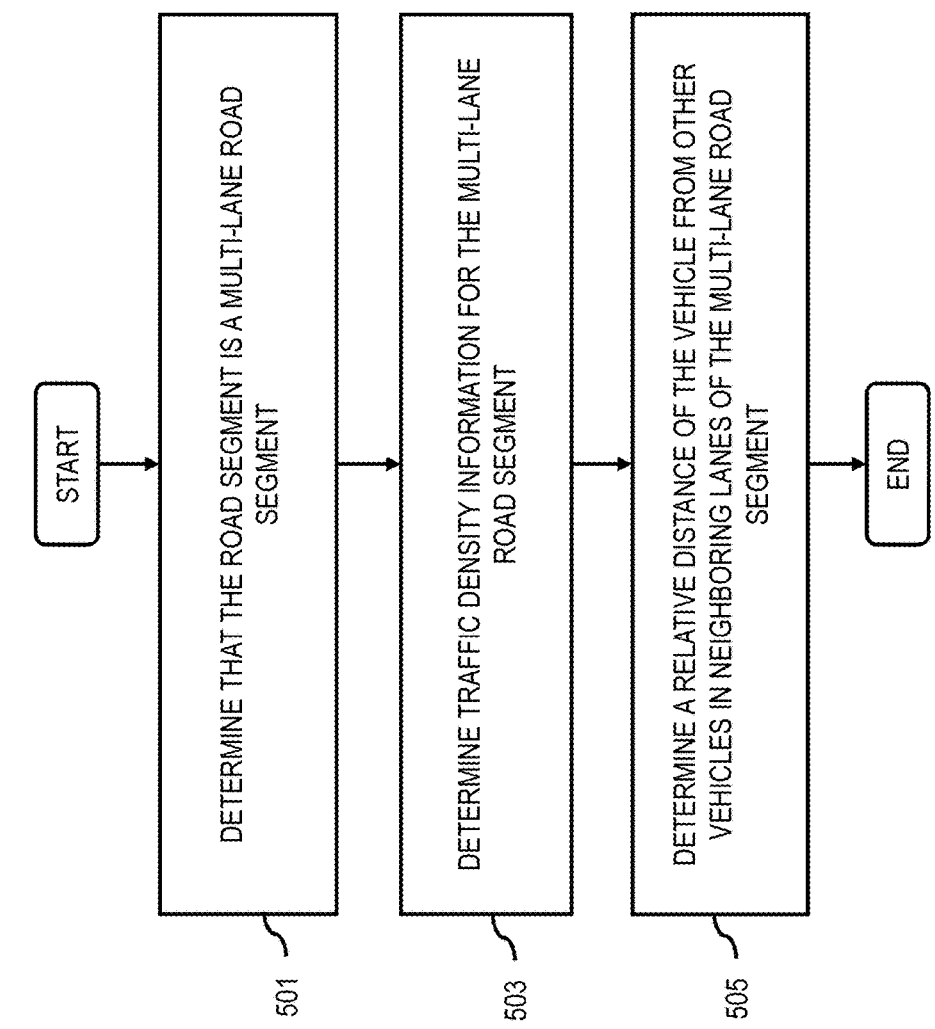
FIG. 5 is a flowchart of a process for determining attributes associated with at least one road segment, according to one embodiment.

FIG. 5 is a flowchart of a process for determining attributes associated with at least one road segment, according to one embodiment. In one embodiment, the selection platform 109 performs the process 500 and is implemented in, for instance, a chip set including a processor and a memory as shown in FIG. 11.

In step 501, the selection platform 109 may determine that the at least one road segment is at least one multi-lane road segment. In one scenario, the selection platform 109 may determine road characteristics including multiple routes at an intersection, multiple lanes within a road segment, intersections, sidewalks, bicycle lanes, etc.

In step 503, the selection platform 109 may determine traffic density information for the at least one multi-lane road segment. In one embodiment, the at least one alternative route is further determined based, at least in part, on the traffic density information. In one scenario, heavy traffic may prevent the driver from switching lanes for turns at highway exits or intersections.

In step 505, the selection platform 109 may determine a relative distance of the at least one vehicle from one or more other vehicles in one or more neighboring lanes of the at least one multi-lane road segment. In one embodiment, the traffic density information is based, at least in part, on the relative distance. In one example embodiment, the selection platform 109 may not recommend at least one vehicle to turn left at the traffic signal because the heavy traffic in the neighboring lanes may prevent the driver from making a left turn. In another example embodiment, the selection platform 109 may determine relative distance for at least one vehicle. The relative distance includes, at least in part, distance in front and/or behind of the at least one vehicle and the one or more neighboring vehicles, distances on the right and/or left of the at least one vehicle and the one or more neighboring vehicles, or a combination thereof. The selection platform 109 may not recommend at least one vehicle to turn right at the traffic signal because the at least one vehicle is too close to the neighboring vehicles to make a safe right turn.

Figure 6:
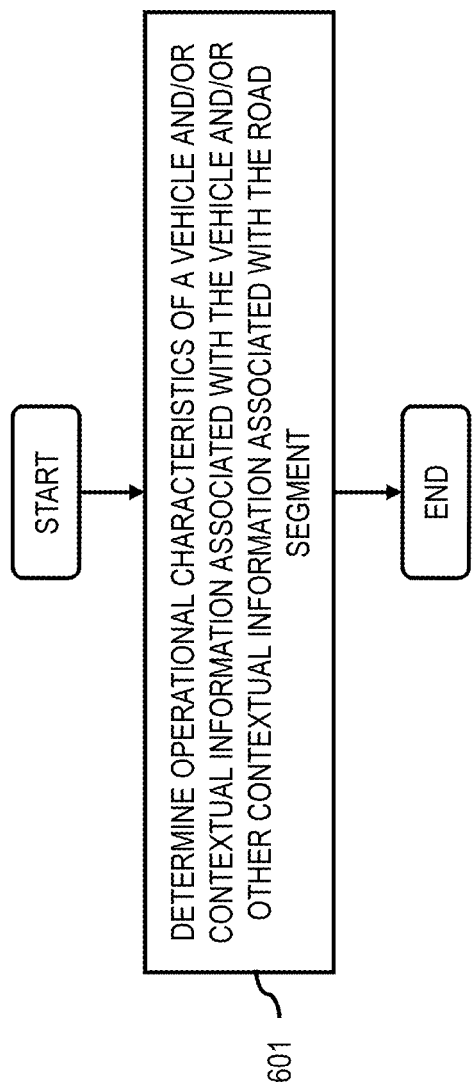
FIG. 6 is a flowchart of a process for determining operational characteristics and/or contextual information associated with a vehicle and/or a road segment, according to one embodiment.

FIG. 6 is a flowchart of a process for determining operational characteristics and/or contextual information associated with a vehicle and/or a road segment, according to one embodiment. In one embodiment, the selection platform 109 performs the process 600 and is implemented in, for instance, a chip set including a processor and a memory as shown in FIG. 11.

In step 601, the selection platform 109 may determine one or more operational characteristics of at least one vehicle, contextual information associated with the at least one vehicle, other contextual information associated with the at least one road segment, or a combination thereof. In one embodiment, the presentation of the at least one notification, the at least one notification, or a combination thereof is based, at least in part, on the one or more operational characteristics. In one example embodiment, the selection platform 109 may determine attributes of the candidate vehicle (e.g., speed, acceleration). Then, the selection platform 109 may cause a notification of at least one recommended route based, at least in part, on the attributes. In another example embodiment, the selection platform 109 may determine geographical features of a road segment (e.g., slope, curvature), road attributes for a road segment (e.g., number of lanes, width of the road, surface of the road), environmental features (e.g., weather, season), temporal information for a road segment (e.g., peak traffic hours), traffic conditions in a road segment (e.g. congestion or free flow), or a combination thereof. Then, the selection platform 109 may incorporate these determined attributes for a road segment with the changing traffic signal to recommend a fastest alternative route.

Figure 7:
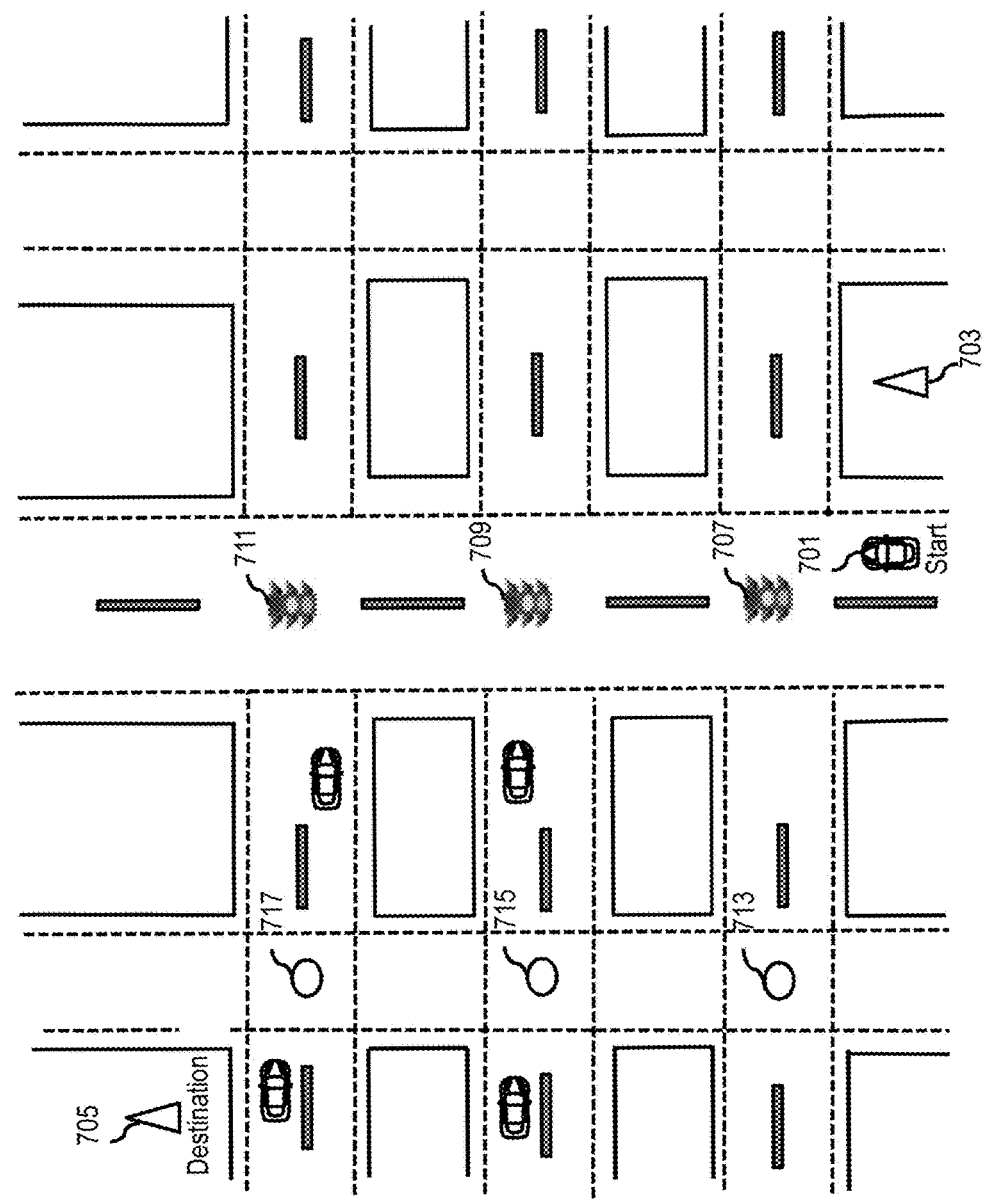
FIG. 7 is a diagram that represents a scenario wherein route for at least one vehicle is recalculated based, at least in part, on the status of traffic lights, the nearby environment, or a combination thereof.

FIG. 7 is a diagram that represents a scenario wherein route for at least one vehicle is recalculated based, at least in part, on the status of traffic lights, the nearby environment, or a combination thereof. In one scenario, vehicle 701 is starting from location 703 towards destination 705. The user of the vehicle 701 may enter the destination information in his/her navigation device, whereupon the navigation device may provide the user with multiple routing options. For example:

(a) Route 1: Drive through traffic signal 707 and 709, and then turn left at traffic signal 711 to reach destination 705.

(b) Route 2: Drive through traffic signal 707 and make a left at traffic signal 709, then turn right at intersection 715 and keep left, then drive via intersection 717 to reach destination 705.

(c) Route 3: Turn left at traffic signal 701, then turn right at intersection 713 and then drive via intersections 715 and 717 to reach destination 705.

The user may choose Route 1, at which point the navigation device may guide the user through the predetermined routing patterns. The current technology does not change the predetermined routing patterns based on the status of traffic light. Accordingly, the selection platform 109 optimizes the travel time by changing predetermined routing patterns based on the status of traffic lights. In one example embodiment, when vehicle 701 is approaching traffic signal 707, the traffic light turns yellow and then to red. Such transition in traffic light may be captured by one or more camera sensors (e.g., mobile phone cameras, 360 degree on-dash cameras, or image sensors associated with a vehicle, etc.). This captured information may be processed in real-time by the selection platform 109. Then, the selection platform 109 may determine a faster route by taking into consideration the status of traffic light. In one scenario, after determining the traffic light status change, the selection platform 109 may implement various mechanisms to know the existence of 'left only' and/or or 'right only' lanes at one or more intersection before calculating a new route. The various mechanisms may comprise but is not limited to the selection platform 109 performing a search in geographic database 111 for lane information and/or making use of the camera sensors in one or more vehicles. In another example embodiment, the selection platform 109 may determine that the traffic light at traffic signal 707 is red, and the left turn arrow will be displayed before the light turns green. As a result, the selection platform 109 may recommend a user to be in the left turn only lane and make a left turn when the left turn arrow is displayed. Then, the user is guided to turn right at intersections 713, and drive through intersections 715 and 717 to reach the destination.

Figure 8A:
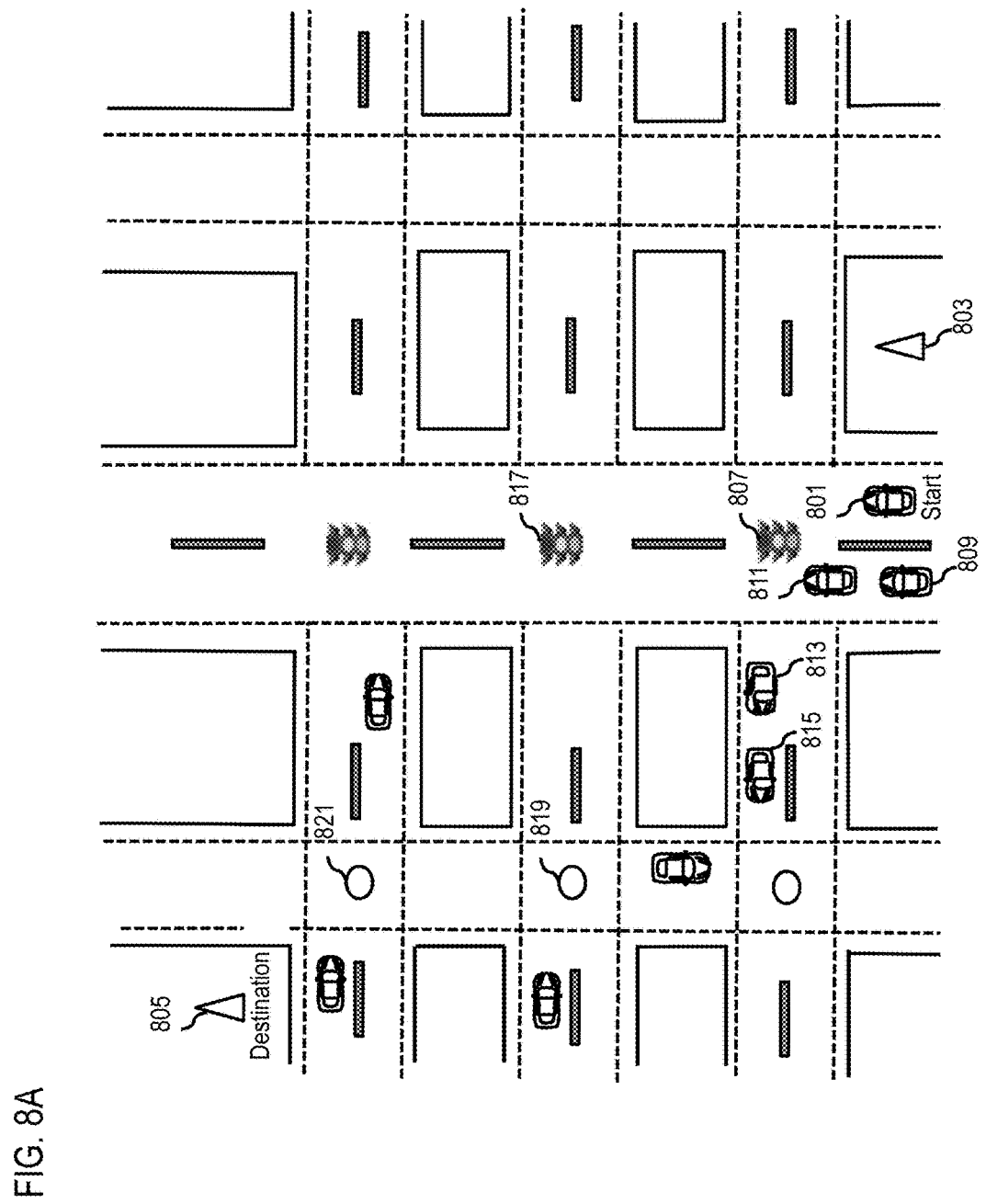
FIG. 8A is a diagram that represents a scenario wherein route for at least one vehicle is recalculated based, at least in part, on acceleration information, traffic density information, or a combination thereof.

FIG. 8A is a diagram that represents a scenario wherein route for at least one vehicle is recalculated based, at least in part, on acceleration information, traffic density information, or a combination thereof. In one example embodiment, vehicle 801 is starting from location 803 towards destination 805. The selection platform 109 may not recommend a user to make a left turn at traffic signal 807 even though the left turn arrow is displayed at the traffic signal because of the traffic density information (vehicles 809, 811, 813 and 815 are blocking the way). The selection platform 109 may determine that the user may reach his/her destination faster by turning left at traffic signal 817 when the left turn arrow is displayed since there is less traffic through intersection 819 and 821. The selection platform 109 may continue with such dynamic calculation throughout the route until the user reaches his/her destination.

Figure 8B:
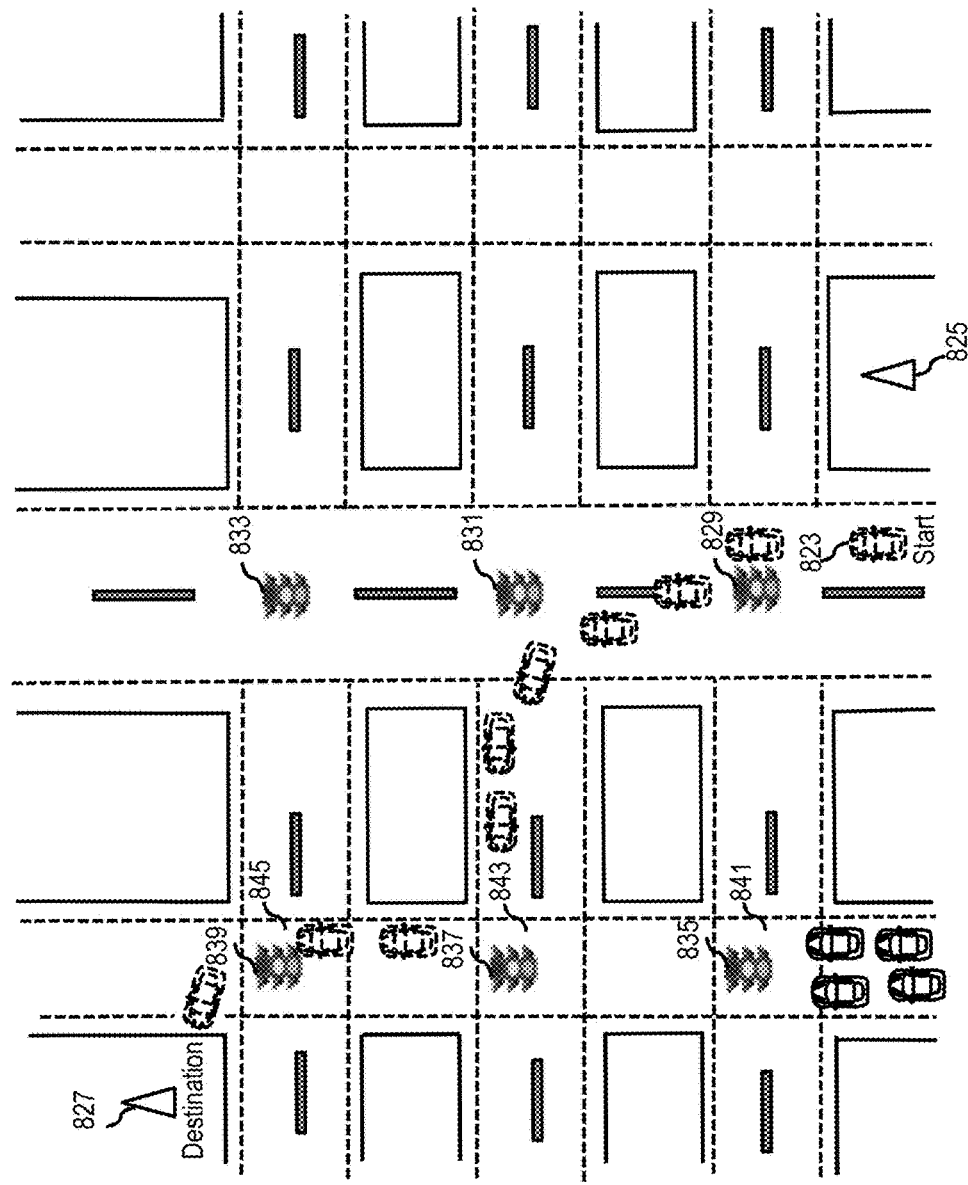
FIG. 8B represents a scenario wherein the selection platform 109 performs dynamic calculation at each and every intersection with traffic light, according to one example embodiment.

FIG. 8B represents a scenario wherein the selection platform 109 performs dynamic calculation at each and every intersection with traffic light, according to one example embodiment. In one scenario, vehicle 823 is starting from location 825 towards destination 827. The route comprises of multiple traffic signals (829, 831, 833, 835, 837, and 839) throughout the intersections. The selection platform 109 may continue to perform dynamic calculation at each intersection with traffic signals (829, 831, 833, 835, 837, and 839) and take into consideration other road attributes. In one scenario, when vehicle 823 is approaching traffic signal 829, the traffic light turns yellow and then to red. The selection platform 109 may not recommend a user of vehicle 823 to make a left turn at traffic signal 829 even though left turn arrow is displayed before the green light because traffic signal 835 turns red by the time vehicle 823 reaches intersection 841. The selection platform 109 may also take into consideration one or more vehicles approaching traffic signal 835. Accordingly, the selection platform 109 may recommend the user of the vehicle 823 to stay on the right side of the lane and drive towards traffic signal 831. Then, when vehicle 823 is approaching traffic signal 831, the traffic light turns yellow and then to red. The selection platform 109 may recommend the user of the vehicle 823 to make a left turn at traffic signal 831 when left turn arrow is displayed before the green light because traffic signal 837 though red now turns green by the time vehicle 823 reaches intersection 843. The selection platform 109 may also take into consideration that there are no vehicles approaching traffic signal 837. Subsequently, the selection platform 109 may recommend the user of vehicle 823 to drive through intersection 845 when the traffic signal 839 is green to reach the destination.

Figure 9:
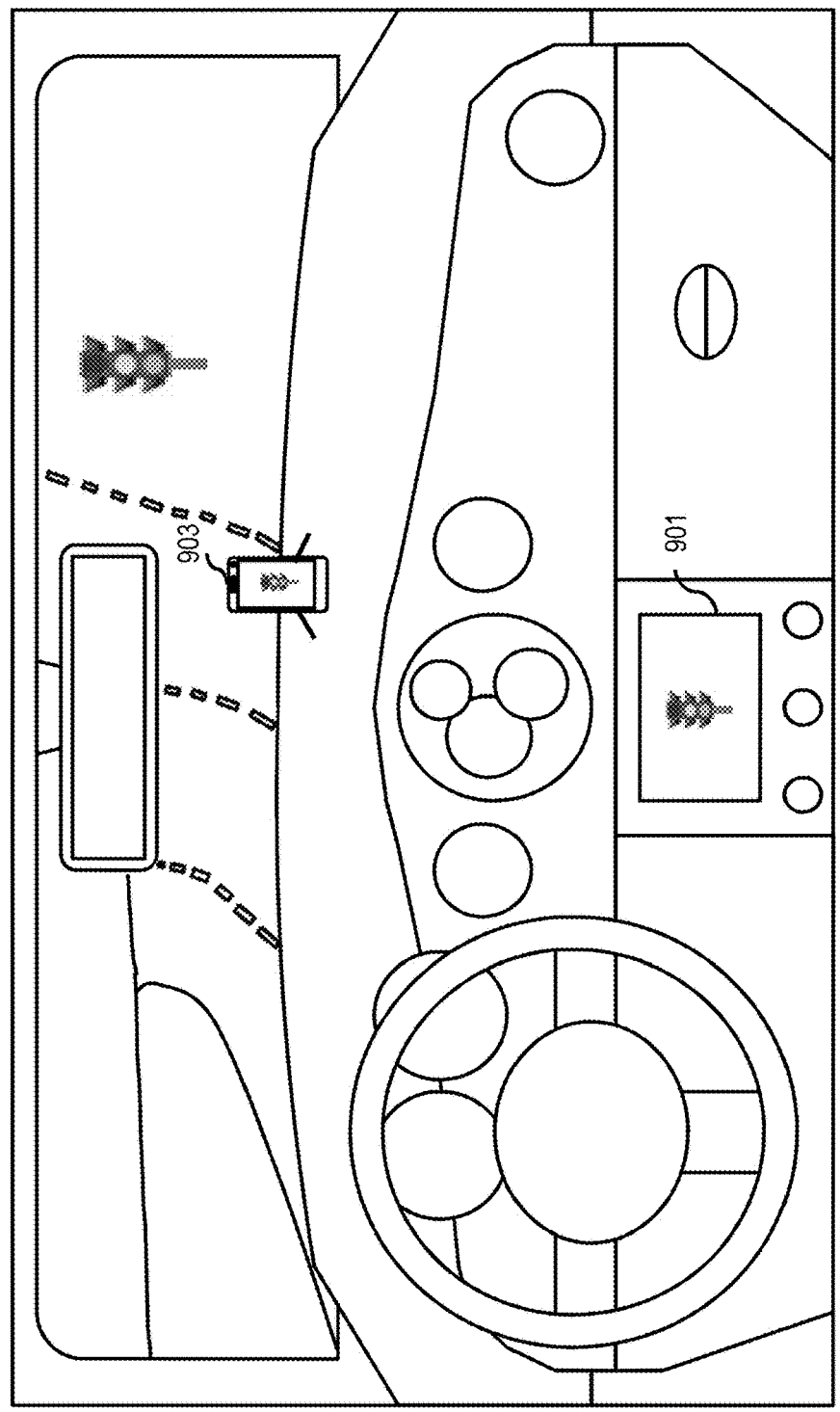
FIG. 9 is a diagram that represents a scenario wherein a change in traffic light signal is captured by at least one camera sensor, according to one example embodiment.

FIG. 9 is a diagram that represents a scenario wherein a change in traffic light signal is captured by at least one camera sensor, according to one example embodiment. In one example embodiment, the camera sensors associated with at least one vehicle 901, the camera sensors associated with at least one user device 903, or a combination thereof may detect changes in traffic light signal. The camera sensors 901 and/or 903 may transmit this information to the selection platform 109 via communication network 107. In another example embodiment, the selection platform 109 may obtain data on traffic light schedules from other sources, such as, database maintained by respective traffic authorities. Then, the selection platform 109 may calculate alternate routes to optimize travel time for at least one user. In one scenario, if a navigation device is making a vehicle turn left, then the selection platform 109 may recommend the driver of the vehicle wait despite the red traffic light because left turn arrow comes before the green light. In another scenario, if a navigation device is making a vehicle go straight, then the selection platform 109 may recommend the driver of the vehicle to turn left when a traffic light is red because left turn arrow comes before the green light. In such manner, the selection platform 109 may save time for at least one user driving a vehicle by making him/her wait for lesser time at traffic signals.

The processes described herein for determining an alternative route based on status information of a traffic signal and/or attributes associated with a road segment may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
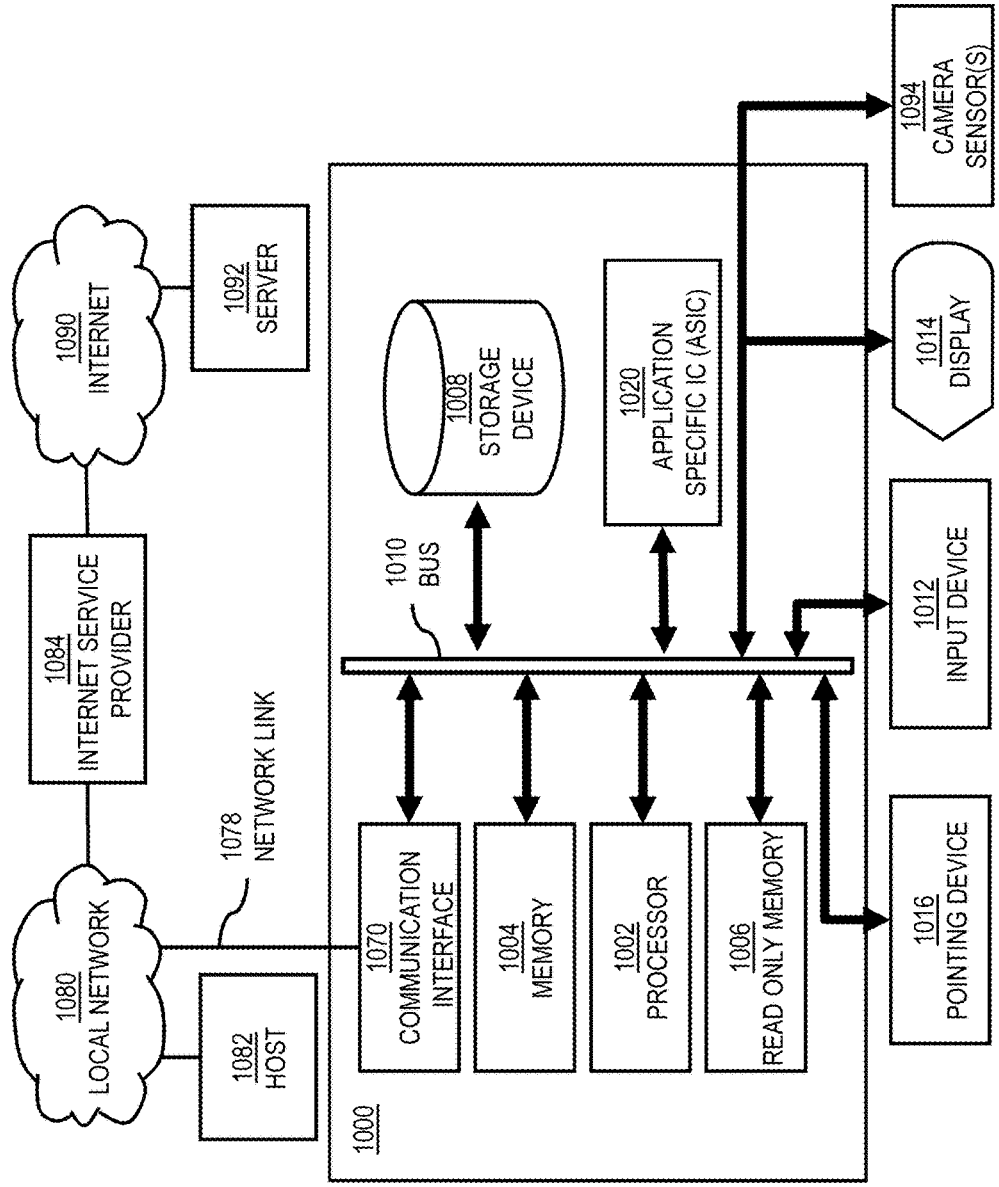
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to determine an alternative route based on status information of a traffic signal and/or attributes associated with a road segment as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of determining an alternative route based on status information of a traffic signal and/or attributes associated with a road segment.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to determining an alternative route based on status information of a traffic signal and/or attributes associated with a road segment. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for determining an alternative route based on status information of a traffic signal and/or attributes associated with a road segment. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining an alternative route based on status information of a traffic signal and/or attributes associated with a road segment, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for determining an alternative route based on status information of a traffic signal and/or attributes associated with a road segment to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to determine an alternative route based on status information of a traffic signal and/or attributes associated with a road segment as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of determining an alternative route based on status information of a traffic signal and/or attributes associated with a road segment.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to determine an alternative route based on status information of a traffic signal and/or attributes associated with a road segment. The memory 1105 also stores the data associated with or generated by the execution of the inventive steps.

Figure 12:
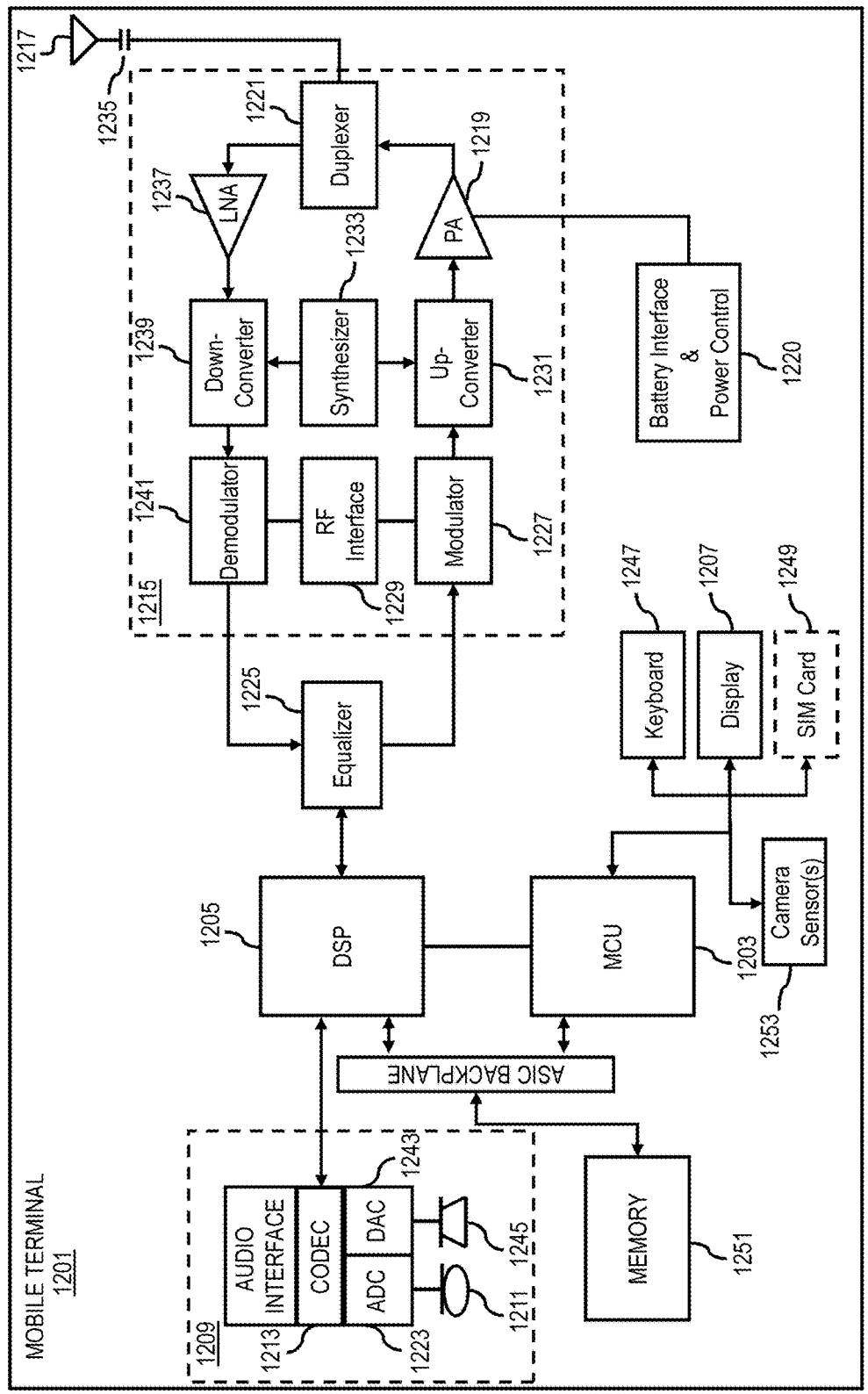
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1A, according to one embodiment. In some embodiments, mobile terminal 1201, or a portion thereof, constitutes a means for performing one or more steps of determining an alternative route based on status information of a traffic signal and/or attributes associated with a road segment. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of determining an alternative route based on status information of a traffic signal and/or attributes associated with a road segment. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to determine an alternative route based on status information of a traffic signal and/or attributes associated with a road segment. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method of optimizing travel time for a vehicle by calculating faster alternative routes comprising:
   detecting with a camera in the vehicle at least one image of at least one traffic signal;
   receiving at a selection server, data sent over a communication network, the data comprising location of the vehicle, distance of the vehicle to the at least one traffic signal, and the at least one image of the at least one traffic signal, the selection server comprising a processor and a memory, wherein the processor:
   determines status information for the at least one traffic signal based on a determination that the vehicle is within at least one distance threshold to the at least one traffic signal on a multi-lane road segment based on the data received at the selection server, wherein determining the status information of the at least one traffic signal comprises determining whether the traffic signal is green or red;
   causes a calculation of at least one alternative route for the vehicle based on the status information for the at least one traffic signal, one or more attributes associated with at least one road segment, and traffic information on neighboring lanes of the multi-lane road segment;
   causes a comparison of estimated time of arrival by the use of the at least one alternative route, at least one original route, or a combination thereof to determine at least one recommended route; and
   causes a presentation of at least one notification regarding the at least one recommended route,
   wherein the at least one notification includes notification of time saved by using the at least one recommended route.

2. The method of claim 1, wherein the processor further:
   determines that the at least one road segment is at least one multi-lane road segment; and
   determines traffic density information for the at least one multi-lane road segment,
   wherein the at least one alternative route is further determined based on the traffic density information.

3. The method of claim 2, wherein the processor further:
   determines a distance of the vehicle from one or more other vehicles in one or more neighboring lanes of the multi-lane road segment,
   wherein the traffic density information is based on the distance.

4. A method of claim 1, further comprising:
   determining one or more operational characteristics of the vehicle, contextual information associated with the vehicle, other contextual information associated with the at least one road segment, or a combination thereof,
   wherein the presentation of the at least one notification is based on the one or more operational characteristics.

5. A method of claim 1, wherein the status information includes change in signal light color for the at least one traffic signal.

6. A method of claim 1, wherein the status information for the at least one traffic signal is determined based on one or more imaging sensors, at least one traffic signal database, or a combination thereof.

7. A method of claim 1, wherein the vehicle includes at least an autonomous vehicle, at least an assisted driving vehicle, or a combination thereof.

8. A method of claim 1, wherein the one or more attributes, associated with the at least one road segment, include a traffic volume attribute, road attributes, or a combination thereof; and wherein the road attributes include number of lanes in the at least one road segment, signage information, or a combination thereof.

9. A method of claim 1, wherein the at least one recommended route is a route with a fastest estimated time of arrival to a destination.

10. A non-transitory computer-readable storage medium carrying one or more sequences of one or more instructions stored thereon executed by a processor to perform a method of optimizing travel time for a vehicle by calculating faster alternative routes, the method comprising:
    detecting with a camera in the vehicle at least one image of at least one traffic signal;

receiving at a selection server, data sent over a communication network, the data comprising location of the vehicle, distance of the vehicle to the at least one traffic signal, and the at least one image of the at least one traffic signal;

determining status information for the at least one traffic signal based on a determination that the vehicle is within at least one distance threshold to the at least one traffic signal on a multi-lane road segment based on the data received at the selection server, wherein determining the status information of the at least one traffic signal comprises determining whether the traffic signal is green or red;

causing a calculation of at least one alternative route for the vehicle based on the status information for the at least one traffic signal, one or more attributes associated with at least one road segment, and traffic information on neighboring lanes of the multi-lane road segment;

causing a comparison of estimated time of arrival by the use of the at least one alternative route, at least one original route, or a combination thereof to determine at least one recommended route; and causing a presentation of at least one notification regarding the at least one recommended route, wherein the at least one notification includes notification of time saved by using the at least one recommended route.

11. The non-transitory computer-readable storage medium of claim 10, wherein the method further comprises:
determining that the at least one road segment is at least one multi-lane road segment; and
determining traffic density information for the at least one multi-lane road segment,
wherein the at least one alternative route is further determined based on the traffic density information.

12. The non-transitory computer-readable storage medium of claim 11, wherein the method further comprises:
determining a distance of the vehicle from one or more other vehicles in one or more neighboring lanes of the multi-lane road segment,
wherein the traffic density information is based on the distance.

13. The non-transitory computer-readable storage medium of claim 10, wherein the method further comprises:
determining one or more operational characteristics of the vehicle, contextual information associated with the vehicle, other contextual information associated with the at least one road segment, or a combination thereof,
wherein the presentation of the at least one notification is based on the one or more operational characteristics.

14. The non-transitory computer-readable storage medium of claim 10, wherein the status information includes change in signal light color for the at least one traffic signal.

15. The non-transitory computer-readable storage medium of claim 10, wherein the status information for the at least one traffic signal is determined based on one or more imaging sensors, at least one traffic signal database, or a combination thereof.

16. The non-transitory computer-readable storage medium of claim 10, wherein the vehicle includes at least an autonomous vehicle, at least an assisted driving vehicle, or a combination thereof.

17. The non-transitory computer-readable storage medium of claim 10, wherein the one or more attributes, associated with the at least one road segment, include a traffic volume attribute, road attributes, or a combination thereof; and wherein the road attributes include number of lanes in the at least one road segment, signage information, or a combination thereof.

18. The non-transitory computer-readable storage medium of claim 10, wherein the at least one recommended route is a route with a fastest estimated time of arrival to a destination.

* * * * *